(12) United States Patent
Newstadt et al.

(10) Patent No.: US 8,688,657 B1
(45) Date of Patent: Apr. 1, 2014

(54) SYSTEMS AND METHODS FOR DATA LOSS PREVENTION

(75) Inventors: Keith Newstadt, West Newton, MA (US); Douglas Gibson, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 142 days.

(21) Appl. No.: 13/229,984

(22) Filed: Sep. 12, 2011

(51) Int. Cl.
*G06F 7/00* (2006.01)
*G06F 17/00* (2006.01)
*G06F 17/30* (2006.01)

(52) U.S. Cl.
USPC ............................ 707/694; 707/713; 707/736

(58) Field of Classification Search
USPC ......................................... 707/694, 713, 736
See application file for complete search history.

(56) References Cited

U.S. PATENT DOCUMENTS

| | | | |
|---|---|---|---|
| 7,886,359 B2 * | 2/2011 | Jones et al. | 726/26 |
| 7,996,373 B1 * | 8/2011 | Zoppas et al. | 707/694 |
| 8,365,243 B1 * | 1/2013 | Lu et al. | 726/1 |
| 8,416,709 B1 * | 4/2013 | Marshall et al. | 370/252 |
| 8,499,152 B1 * | 7/2013 | Chen et al. | 713/165 |
| 2009/0300770 A1 * | 12/2009 | Rowney et al. | 726/26 |
| 2010/0095348 A1 * | 4/2010 | Foster et al. | 726/1 |
| 2010/0162347 A1 * | 6/2010 | Barile | 726/1 |
| 2012/0016884 A1 * | 1/2012 | Rowney et al. | 707/747 |
| 2012/0291087 A1 * | 11/2012 | Agrawal | 726/1 |

* cited by examiner

*Primary Examiner* — Tony Mahmoudi
*Assistant Examiner* — Merilyn Nguyen
(74) *Attorney, Agent, or Firm* — ALG Intellectual Property LLC

(57) ABSTRACT

A computer-implemented method for data loss prevention may include (1) identifying a network configured with a data loss prevention system, (2) identifying a file subject to a data loss prevention assessment within the network, (3) identifying a source of the file, the source of the file causing an entry of the file onto the network, (4) determining, based on the source of the file, that the file is subject to a data loss prevention policy, and (5) applying the data loss prevention policy to the file based on the determination that the file is subject to the data loss prevention policy. Various other methods, systems, and computer-readable media are also disclosed.

20 Claims, 6 Drawing Sheets

US 8,688,657 B1

SYSTEMS AND METHODS FOR DATA LOSS PREVENTION

BACKGROUND

Due to recent technological advances, individuals and organizations may quickly and easily share, access, and disseminate high volumes of digital information. For many individuals and organizations, the ease with which information may be electronically disseminated is empowering. However, the ubiquity of high-speed Internet access, smart mobile devices, and portable storage devices may pose unique challenges for individuals and organizations concerned with preventing the loss and/or exposure of sensitive data. Individuals and organizations are therefore increasingly looking to data loss prevention ("DLP") solutions to protect their sensitive data.

Conventional DLP systems typically attempt to protect sensitive data through the use of describing and fingerprinting technologies. Describing technologies typically involve identifying matches to keywords, expressions, patterns, or file types, and by performing other signature-based detection techniques. Fingerprinting technologies, on other hand, typically involve identifying exact matches to whole or partial files. While potentially effective in protecting much of an organization's sensitive data, fingerprinting and describing technologies may fail to accurately identify new items of sensitive data (i.e., items of sensitive data that have not been encountered before) and/or modifications to existing items of sensitive data. Because of this, existing DLP systems may be unable to adequately monitor and protect various types of unstructured sensitive data and intellectual property, such as product formulas, source code, and sales and marketing reports. Accordingly, the instant disclosure identifies a need for additional and improved systems and methods for data loss prevention.

SUMMARY

As will be described in greater detail below, the instant disclosure generally relates to systems and methods for data loss prevention by tracking and accounting for the points of entry and/or sources of files stored on networks protected by data loss prevention techniques. For example, these systems and methods may differentiate between corporate and personal data based on the source of the data. In one example, a computer-implemented method for data loss prevention may include (1) identifying a network configured with a data loss prevention system, (2) identifying a file subject to a data loss prevention assessment within the network, (3) identifying a source of the file, the source of the file causing an entry of the file onto the network, (4) determining, based on the source of the file, that the file is subject to a data loss prevention policy, and (5) applying the data loss prevention policy to the file based on the determination that the file is subject to the data loss prevention policy.

In one example, identifying the source of the file may include generating a unique identifier of the file based on the content of the file and looking up the source of the file in a database using the unique identifier. In some examples, the computer-implemented method may also include generating the database entry. For example, the computer-implemented method may include (1) identifying the entry of the file onto the network, and, in response to identifying the entry of the file onto the network, (2) determining the source of the file, (3) generating the unique identifier of the file based on the content of the file, and (4) associating the source of the file with the unique identifier of the file in the database.

In some examples, identifying the source of the file may include identifying an email address of a sender of the file to the network. In these examples, the computer-implemented method may determine that the file is subject to the data loss prevention policy based on the email address. Additionally or alternatively, identifying the source of the file may include identifying an application within the network that generated the file. In this example, the computer-implemented method may determine that the file is subject to the data loss prevention policy based on the application generating the file within the network.

In one embodiment, determining, based on the source of the file, that the file is subject to the data loss prevention policy may include determining that the source of the file indicates that the file includes data created for use only within the network.

In some examples, identifying the source of the file may include identifying multiple sources of the file. In these examples, the computer-implemented method may determining that the file is subject to the data loss prevention policy based on each source of the file.

In one example, the computer-implemented method may also process a file that is not subject to the data loss prevention policy based on the source. For example, the computer-implemented method may (1) identify an additional file subject to an additional data loss prevention assessment within the network, (2) identify an additional source of the additional file, the additional source of the additional file causing an additional entry of the additional file onto the network, (3) determine, based on the additional source of the additional file, that the additional file is not subject to the data loss prevention policy, and (4) allow a use of the additional file based on determining that the additional file is not subject to the data loss prevention policy. In this example, the computer-implemented method may include determining that the additional source of the additional file indicates that the additional file does not include data created for use only within the network. Additionally or alternatively, where the additional source of the additional file includes a public web site, the computer-implemented method may include determining that the file is not subject to the data loss prevention policy based on the public website being public and outside the scope of data loss prevention for the network.

In one embodiment, a system for implementing the above-described method may include an identification module programmed to identify a network configured with a data loss prevention system and to identify a file subject to a data loss prevention assessment within the network. The system may also include a source module programmed to identify a source of the file, the source of the file causing an entry of the file onto the network. The system may additionally include a determination module programmed to determine, based on the source of the file, that the file is subject to a data loss prevention policy. The system may further include an application module programmed to apply the data loss prevention policy to the file based on the determination that the file is subject to the data loss prevention policy. In addition, the system may include at least one processor configured to execute the identification module, the source module, the determination module, and the application module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a network configured with a data loss prevention system, (2) identify a file subject to a data loss prevention assessment within the network, (3) identify a source of the file, the source of the file causing an entry of the file onto the network, (4) determine, based on the source of the file, that the file is subject to a data loss prevention policy, and (5) apply the data loss prevention policy to the file based on the determination that the file is subject to the data loss prevention policy.

As will be explained in greater detail below, by tracking and accounting for the points of entry and/or sources of files stored on networks protected by data loss prevention techniques, the systems and methods described herein may improve the accuracy of data loss prevention systems with minimal additional consumption of computing resources and/or preserve the accuracy of data loss prevention systems while significantly reducing the consumption of computing resources.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
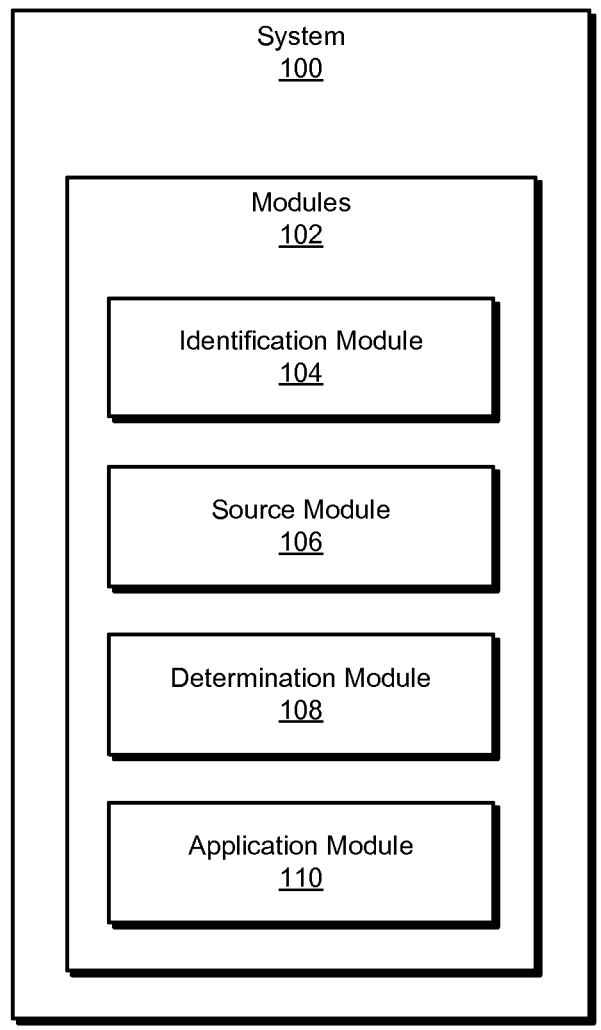
FIG. 1 is a block diagram of an exemplary system for data loss prevention.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
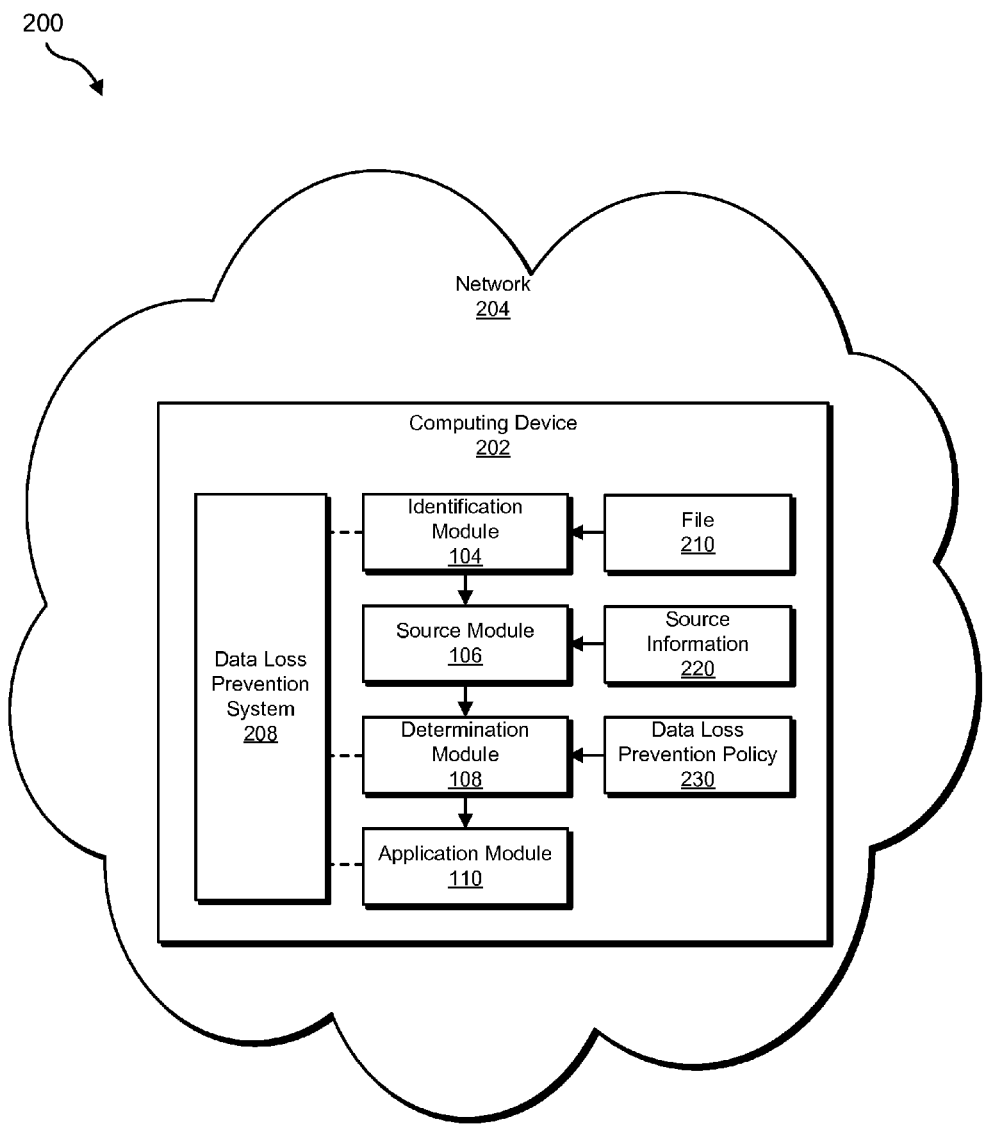
FIG. 2 is a block diagram of an exemplary system for data loss prevention.
Figure 3:
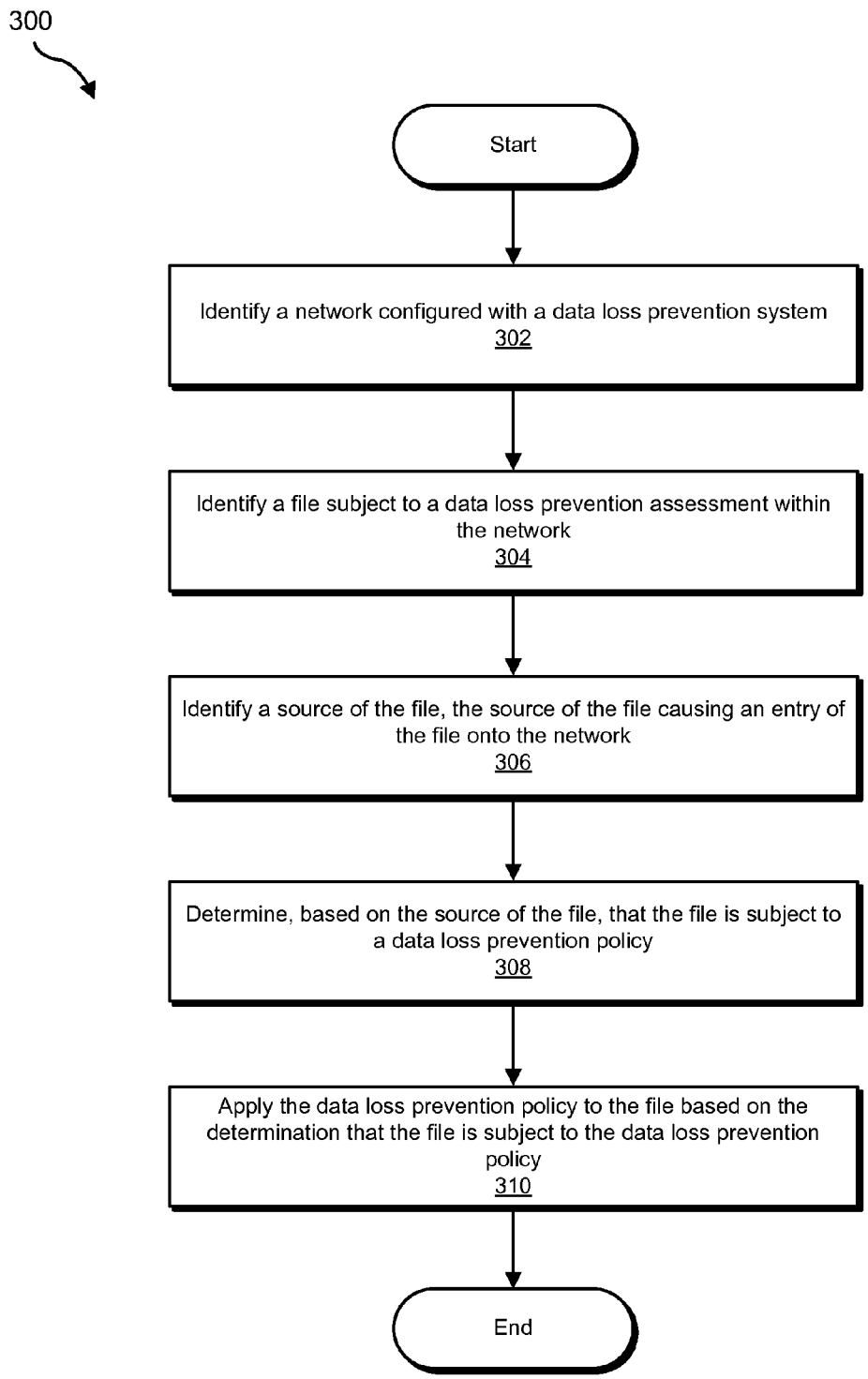
FIG. 3 is a flow diagram of an exemplary method for data loss prevention.
Figure 4:
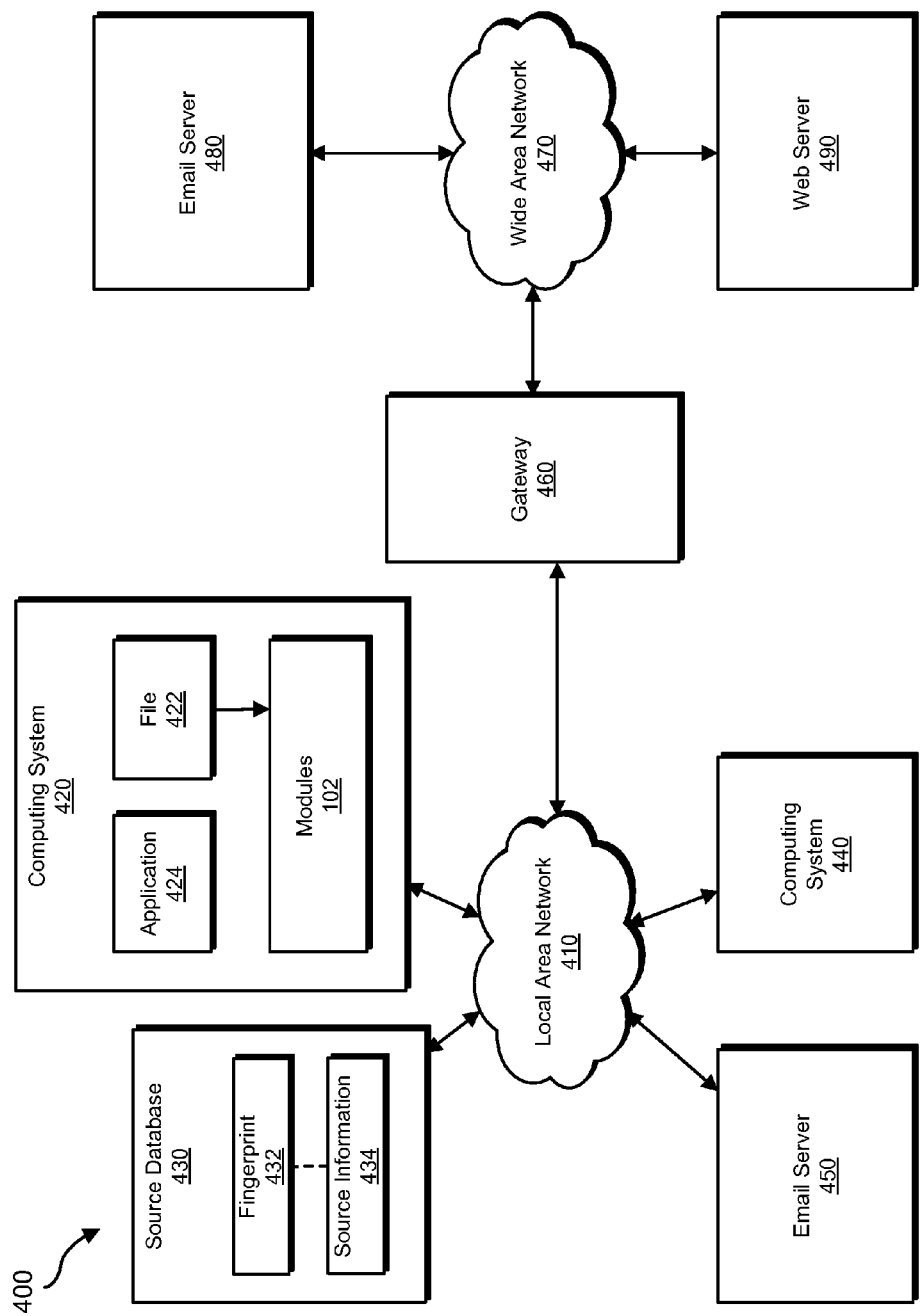
FIG. 4 is a block diagram of another exemplary system for data loss prevention.

The following will provide, with reference to FIGS. 1, 2, and 4, detailed descriptions of exemplary systems for data loss prevention. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for data loss prevention. As illustrated in this figure, exemplary system 100 may include one or more modules 102 for performing one or more tasks. For example, and as will be explained in greater detail below, exemplary system 100 may include an identification module 104 programmed to identify a network configured with a data loss prevention system and identify a file subject to a data loss prevention assessment within the network. Exemplary system 100 may also include a source module 106 programmed to identify a source of the file, the source of the file causing an entry of the file onto the network.

In addition, and as will be described in greater detail below, exemplary system 100 may include a determination module 108 programmed to determine, based on the source of the file, that the file is subject to a data loss prevention policy. Exemplary system 100 may also include an application module 110 programmed to apply the data loss prevention policy to the file based on the determination that the file is subject to the data loss prevention policy. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 operating within a network 204 configured with a data loss prevention system 208.

In one embodiment, one or more of modules 102 from FIG. 1 may, when executed by at least one processor of computing device 202, facilitate computing device 202 in data loss prevention. For example, identification module 104 may cause computing device 202 to identify network 204 configured with data loss prevention system 208 and to identify file 210 subject to a data loss prevention assessment within network 204. Source module 106 may cause computing device 202 to identify a source of file 210 (e.g., with source information 220), and the source of file 210 may cause an entry of file 210 onto network 204. Determination module 108 may be programmed to determine, based on source information 220 of file 210, that file 210 is subject to a data loss prevention policy 230. Application module 110 may cause computing device 202 to apply data loss prevention policy 230 to file 210 based on the determination that file 210 is subject to data loss prevention policy 230.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In some examples, network 204 may facilitate communication between computing device 202 and one or more additional computing devices within network 204.

FIG. 3 is a flow diagram of an exemplary computer-implemented method 300 for data loss prevention. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a network configured with a data loss prevention system. For example, at step 302 identification module 104 may, as part of computing device 202 in FIG. 2, identify network 204 configured with data loss prevention system 208.

As used herein, the phrase "data loss prevention system" may refer to a system for protecting sensitive information by applying one or more policies, rules, and/or heuristics to data within the bounds of the system to determine the disposition of the data in various scenarios. In some examples, a "data loss prevention system" may be configured to prevent sensitive information from leaking (e.g., being transmitted outside the bounds of the system under uncontrolled circumstances).

Identification module 104 may identify the network in any of a variety of ways. For example, identification module 104 may identify the network by executing on a system within the network. Additionally or alternatively, identification module 104 may identify the network by receiving a message from the data loss prevention system. In some examples, identification module 104 may identify the network by operating as a part of the data loss prevention system (e.g., in an integrated build and/or as a plug-in). In some examples, identification module 104 may identify the network by identifying a connection to a local area network.

FIG. 4 illustrates an exemplary system 400 for data loss prevention. As illustrated in FIG. 4, a local area network 410 may include a computing system 420, a source database 430, a computing system 440, and an email server 450. Local area network 410 may also connect to a wide area network 470 via a gateway 460. Wide area network 470 may include an email server 480 and a web server 490. In some examples, local area network 410 may require data loss prevention (e.g., to prevent sensitive files within local area network 410 from leaking onto wide area network 470). Using FIG. 4 as an example for step 302, at step 302 identification module 104 may, as part of computing system 420, identify local area network 410.

Returning to FIG. 3, at step 304 one or more of the systems described herein may identify a file subject to a data loss prevention assessment within the network. For example, at step 304 identification module 104 may, as part of computing device 202 in FIG. 2, identify file 210 as subject to a data loss prevention assessment within network 204. Using FIG. 4 as an additional example, at step 304 identification module 104 may, as part of computing system 420, identify file 422 as subject to a data loss prevention assessment within local area network 410.

As used herein, the term "file" may refer to any unit of data, including, without limitation, files, directories, data objects, records, database entries, and documents. The file may be subject to the data loss prevention assessment in any of a variety of contexts. For example, the file may be subject to the data loss prevention assessment as data-in-motion; e.g., because an attempt to copy and/or move the file and/or a portion of the file from one location to another location has been made. In another example, the file may be subject to the data loss prevention assessment as data-in-use; e.g., because an attempt to open, view, and/or apply the file and/or a portion of the file has been made. As another example, the file may be subject to the data loss prevention assessment as data-at-rest; e.g., because the file is scheduled for an assessment, because the file is stored at a certain location, because the file has been randomly selected, etc. Using FIG. 4 as an example, file 422 may be subject to the data loss prevention assessment because a user of computing system 420 is trying to email file 422 to a destination on wide area network 470, because a user of computing system 420 is trying to open file 422, or simply because file 422 has been selected as a part of a network-wide scan on local area network 410.

Identification module 104 may identify the file in any suitable manner. For example, identification module 104 may identify the file by receiving a message from the data loss prevention system. Additionally or alternatively, identification module 104 may identify the file by operating as a part of the data loss prevention system.

Returning to FIG. 3, at step 306 one or more of the systems described herein may identify a source of the file, the source of the file causing an entry of the file onto the network. For example, at step 306 source module 106 may, as part of computing device 202 in FIG. 2, identify a source of file 210 (e.g., with source information 220), the source of file 210 causing an entry of file 210 onto network 204. Using FIG. 4 as an additional example, at step 306 source module 106 may, as part of computing system 420, identify a source of file 422.

As used herein, the term "source" as it pertains to a file may refer to any information regarding the origin of the file and/or the cause behind the appearance of the file on the network. Accordingly, the "source" of a file may variously refer to the sender of the file, the creator of the file, the owner of the file, and/or the original location of the file. Generally, the term "source" may refer to any information useful to determining whether the origins of the file are within the network and/or an extended network of interest to the data loss prevention system (e.g., business partners, clients, and the like who may, from outside the network, contribute sensitive data to the network), or whether the origins of the file are outside the network and do not contain sensitive information intended to be protected by the data loss prevention system.

Source module 106 may identify the source of the file in any suitable manner. For example, source module 106 may identify the source of the file by generating a unique identifier of the file based on the content of the file and looking up the source of the file in a database using the unique identifier. Source module 106 may use any suitable method to generate the unique identifier. For example, source module 106 may calculate a hash of the file to generate a fingerprint of the file. Source module 106 may then query the database with the fingerprint and receive information from the database identifying the source of the file in response.

In some examples, one or more systems described herein may also generate the entry associating the unique identifier of the file and the source of the file in the database. For example, when the file enters the network, source module 106 may identify the entry of the file onto the network, and, in response to identifying the entry of the file onto the network, determine the source of the file. Source module 106 may then generate the unique identifier of the file based on the content of the file and associate the source of the file with the unique identifier of the file in the database. Source module 106 may identify the entry of the file onto the network and determine the source of the file in any of a variety of ways. For example, source module 106 may receive a message from and/or operate as part of a file system filter driver that identifies an application creating or modifying the file on disk. In another example, the file system filter driver may identify a location where the file is moved and/or copied from. In some examples, source module 106 may receive a message from and/or operate as part of a network filter driver to identify a website that the file was downloaded from. As another example, source module 106 may receive a message from and/or operate as part of a mail server that identifies an email address that an attachment and/or email content was sent from.

As will be explained in greater detail below, because the file may be identified by a unique identifier generated from the content of the file, identical copies of the file may share a single entry in the database linking the unique identifier of the identical copies to their respective sources. In some examples, source module 106 may only add the source of a file to the database if the source may trigger a data loss prevention policy and/or if the source may add new relevant information for evaluating a data loss prevention policy.

As mentioned earlier, the source of the file may be represented as any of a variety of information. For example, source module 106 may identify the source of the file by identifying an email address of a sender of the file to the network. Additionally or alternatively, source module 106 may identify the source of the file by identifying an application within the network that generated the file.

Using FIG. 4 as an example, at step 306 source module 106 may identify the source of file 422 by generating a fingerprint 432 of file 422 and querying source 430 with fingerprint 432. Source database 430 may return associated source information 434 in response to the query.

Returning to FIG. 3, at step 308 one or more of the systems described herein may determine, based on the source of the file, that the file is subject to a data loss prevention policy. For example, at step 308 determination module 108 may, as part of computing device 202 in FIG. 2, determine, based on source information 220 of file 210, that file 210 is subject to data loss prevention policy 230. Using FIG. 4 as an additional example, at step 308 determination module 108 may, as part of computing system 420, determine, based on source information 434 of file 422, that file 422 is subject to a data loss prevention policy.

Determination module 108 may determine that the file is subject to the data loss prevention policy in any of a variety of ways. For example, determination module 108 may determine that the source of the file indicates that the file includes data created for use only within the network. In some examples, determination module 108 may determine that source indicates the existence of such data in the file by comparing the source to a predefined list of sources (e.g., a list of sources indicating sensitive data and/or a list of sources indicating non-sensitive data) and/or by categorizing the source (e.g., by the domain of the email address of the sender) and looking up a rule for the category of the source. Additional specific examples will also be provided below.

As mentioned earlier, in some examples, source module 106 may identify the source of the file by identifying an email address of a sender of the file to the network. In these examples, determination module 108 may determine, based on the email address, that the file is subject to a data loss prevention policy. For example, determination module 108 may identify the email address as an address that belongs to a member of the same organization that owns the network. Additionally or alternatively, determination module 108 may identify the email address as an address that belongs to a partnering organization or individual of the organization that owns the network. In some examples, determination module 108 may compare the email address against a corporate directory to determine whether the email address pertains to the organization. In some examples, determination module 108 may build such a corporate directory by analyzing patterns of emails sent to determine which email addresses likely pertain to the organization and which do not.

As was also mentioned earlier, in some examples, source module 106 may identify the source of the file by identifying an application within the network that generated the file. In these examples, determination module 108 may determine that the file is subject to the data loss prevention policy based on the application generating the file within the network. For example, determination module 108 may determine that the file pertains to the network simply because an application within the network generated the file. In some examples, determination module 108 may determine that the file pertains to the network based on the specific application that generated the file (e.g., because the specific application implies the potential for sensitive data). For example, determination module 108 may determine that an office suite application generated the file within the network and that, therefore, the file is subject to a data loss prevention policy (whereas, e.g., a playlist file generated by a media player on the network may not be subject to the data loss prevention policy).

In some examples, the systems and methods described herein process an additional file and determine that the additional file is not subject to the data loss prevention policy. For example, identification module 104 may identify an additional file subject to an additional data loss prevention assessment within the network and source module 106 may identify an additional source of the additional file, where the additional source of the additional file causes an additional entry of the additional file onto the network. In this example, determination module 108 may determine, based on the additional source of the additional file, that the additional file is not subject to the data loss prevention policy. For example, determination module 108 may determine that the additional source of the additional file indicates that the additional file does not include data created for use only within the network. As an example, determination module 108 may determine that a file attached to an email is not subject to the data loss prevention policy because the email address of the sender is an apparent personal email address (e.g., with a domain not implying the sender's professional affiliation with any organization, not listed in a corporate directory, not appearing in any corporate database, etc.).

In another example, the source of the additional file may include a public web site from which the additional file was downloaded to the network. For example, the files and other resources on the web site may be generally accessible by the public and/or of no relation to sensitive data stored on the network. In this example, determination module 108 may determine, based on the public website being public and outside the scope of data loss prevention for the network, that the file is not subject to the data loss prevention policy. For example, if the file was downloaded to the network from "www.amazon.com," determination module 108 may categorize the source as a web site used for personal reasons on the network rather than organizational reasons implying sensitive data. Additionally or alternatively, determination module 108 may categorize the source as a source where others outside the network could freely access the file and, as such, the file is likely not sensitive (and if it were, it has already leaked and can no longer be effectively protected).

As mentioned earlier, in some examples, multiple copies of a file may exist on the network and, as such, multiple sources may be associated with the file. Additionally or alternatively, multiple sources may be associated with a file where multiple sources contributed to the existence of the file on the network (e.g., the file is downloaded from a link sent in an email, and both the web site behind the link and the sender of the email are recorded as sources of the file). For example, source module 106 may identify a plurality of sources of the file. In this example, determination module 108 may determine that the file is subject to the data loss prevention policy by determining, based on the each source within the plurality of sources of the file, that the file is subject to a data loss prevention policy. For example, the file may have been sent as an attachment from a personal email address to a corporate email account on the network. The corporate email account may have then forwarded the personal email with the attachment to another corporate email account on the network, creating a second copy of the file. Even though the source of the second copy of the file was a corporate email address, determination module 108 may determine that the file is subject to the data loss prevention policy by additionally identifying the personal email address as a source.

Determination module 108 may use any of a variety of approaches to use the source in determining that the data loss prevention policy applies to the file. In some examples, determination module 108 may use the source of the file as a factor among multiple factors, including traditional data loss prevention techniques such as keyword scans and/or other content-based scans. Accordingly, determination module 108 may use the source to generate a composite data loss threat score, as part of a heuristic, and/or combine the source with other data and techniques in any suitable manner for improving the performance of the data loss prevention system. Additionally or alternatively, determination module 108 may use the source of the file as the only factor to determine that the file is subject to the data loss prevention policy.

Using FIG. 4 as an example, source information 434 may indicate that file 422 was generated by application 424 (i.e., from within local area network 410) and determination module 108 may therefore determine that file 422 is subject to the data loss prevention policy. As another example, source information 434 may indicate that file 422 was copied from computing system 440 (i.e., from within local area network 410) and determination module 108 may therefore determine that file 422 is subject to the data loss prevention policy. In an additional example, source information 434 may indicate that file 422 was downloaded from web server 490 and therefore determine that file 422 is not subject to the data loss prevention policy.

Returning to FIG. 3, at step 310 one or more of the systems described herein may apply the data loss prevention policy to the file based on the determination that the file is subject to the data loss prevention policy. For example, at step 310 application module 110 may, as part of computing device 202 in FIG. 2, apply data loss prevention policy 230 to file 210 based on the determination that file 210 is subject to data loss prevention policy 230. Using FIG. 4 as an additional example, at step 310 application module 110 may, as part of computing system 420, apply the data loss prevention policy to file 422 (e.g., prevent file 422 from being transferred beyond gateway 460).

Application module 110 may apply any suitable data loss prevention policy to the file. For example, application module 110 may block an attempt to move, copy, and/or transfer the file. In some examples, application module 110 may generate a report regarding the applicability of the data loss prevention policy to the file (e.g., that a user attempted to copy the file off the network). Additionally or alternatively, application module 110 may automatically redact a portion of the file. Generally, application module 110 may perform any suitable data loss prevention remediation procedure on the file.

As mentioned earlier, in some examples the systems and methods described herein may determine that an additional file was not subject to the data loss prevention policy. In these examples, application module 110 may simply allow a use of the additional file based on determining that the additional file is not subject to the data loss prevention policy. For example, application module 110 may identify a procedure involving the file (e.g., sending the file outside the network as an attachment in an email) that was intercepted by the data loss prevention system and allow the procedure to resume.

As explained above, by tracking and accounting for the points of entry and/or sources of files stored on networks protected by data loss prevention techniques, the systems and methods described herein may improve the accuracy of data loss prevention systems with minimal additional consumption of computing resources and/or preserve the accuracy of data loss prevention systems while significantly reducing the consumption of computing resources.

Figure 5:
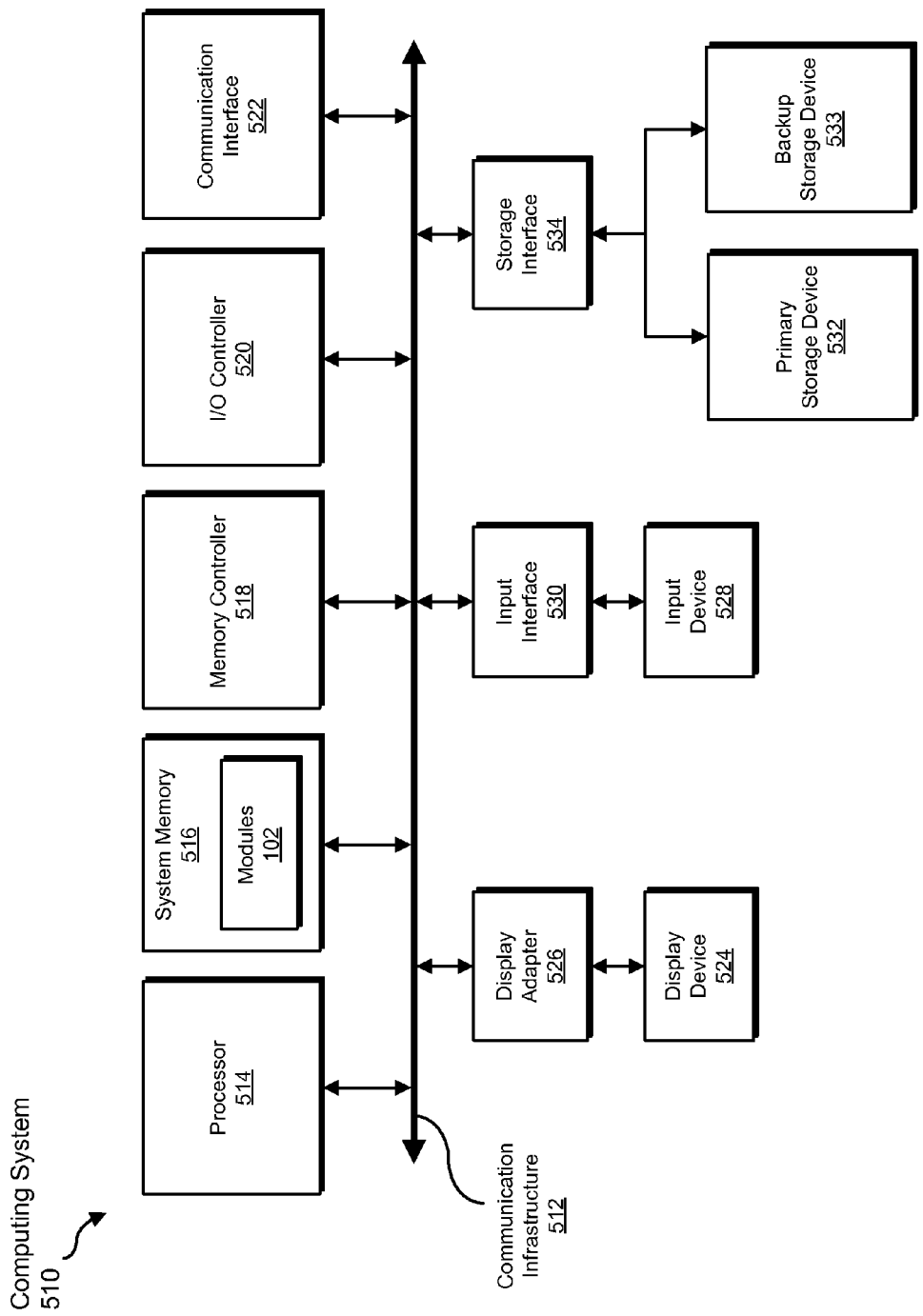
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, generating, looking up, determining, associating, applying, and/or allowing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
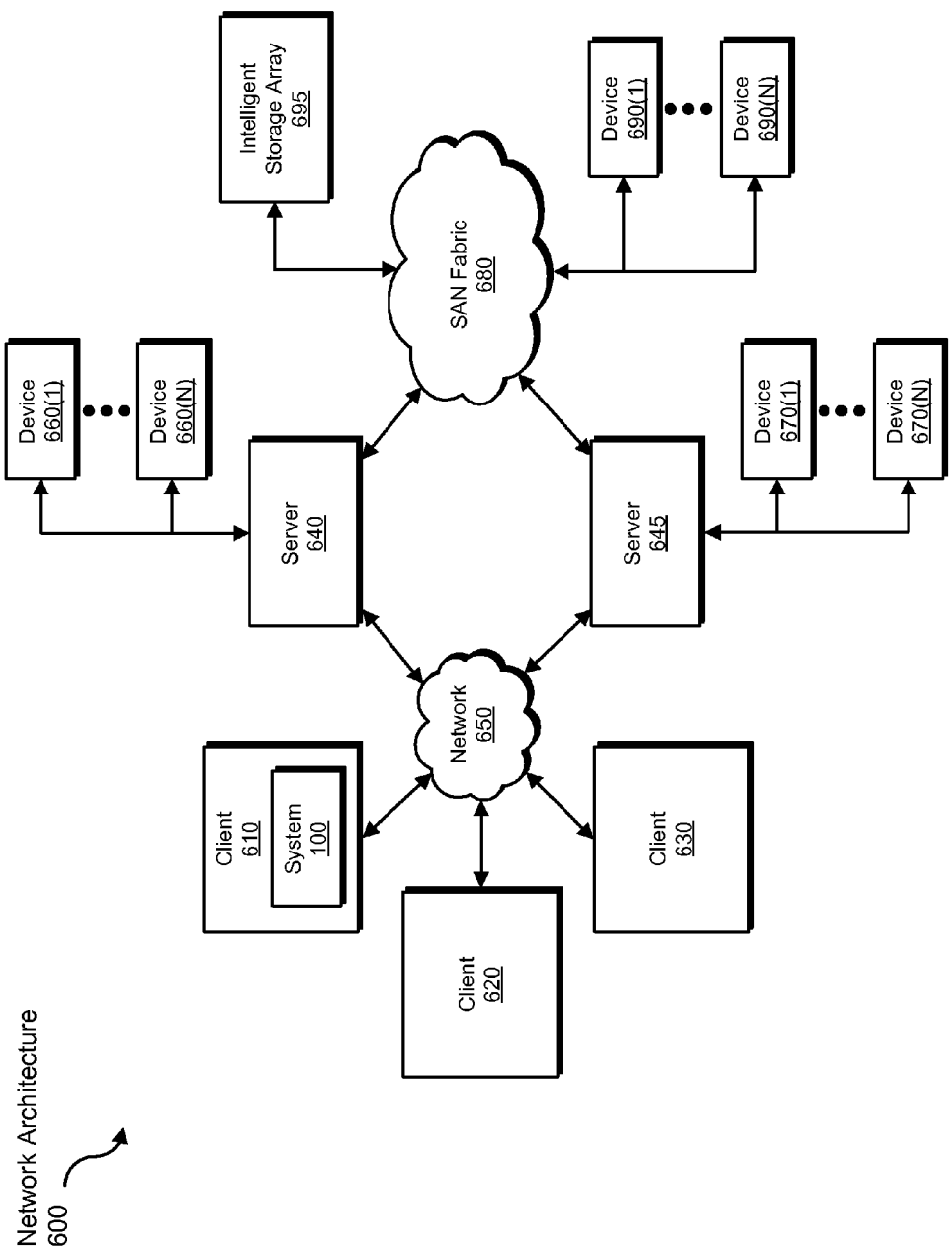
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, generating, looking up, determining, associating, applying, and/or allowing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for data loss prevention.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a network into a network secured against data loss. As another example, one or more of the modules recited herein may transform a computing system into an efficient data loss prevention system.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for data loss prevention, at least a portion of the method being performed by a computing device comprising at least one processor, the method comprising:
    identifying a network configured with a data loss prevention system;
    identifying a first file within the network;
    identifying a source of the first file by determining that an origin of the first file is within the network;
    determining, based on the source of the first file being within the network, that the first file is subject to a data loss prevention policy;
    applying the data loss prevention policy to the first file based on the determination that the first file is subject to the data loss prevention policy;
    identifying entry of a second file into the network;
    in response to identifying the entry of the second file into the network, identifying a source of the second file;
    determining, based on the source of the second file, that an origin of the second file is outside the network, the source of the second file causing the entry of the second file into the network;
    determining that the origin of the second file does not contain sensitive information intended to be protected by the data loss prevention system;
    allowing a use of the second file based on a determination that the second file is not subject to the data loss prevention policy.

2. The computer-implemented method of claim 1, wherein:
    identifying the source of the first file comprises:
        identifying the entry of the first file into the network;
        in response to identifying the entry of the first file into the network, generating a unique identifier of the first file based on the content of the first file;
        looking up the source of the first file in a database using the unique identifier.

3. The computer-implemented method of claim 2, wherein:
    identifying the source of the second file comprises categorizing the source of the second file;
    determining that the origin of the second file is outside the network comprises looking up a rule for the category of the source of the second file.

4. The computer-implemented method of claim 3, wherein categorizing the source of the second file comprises categorizing the source of the second file as a source where others outside the network could freely access the second file.

5. The computer-implemented method of claim 1, wherein:
    identifying the source of the first file comprises identifying an email address of a sender of the first file to the network;
    determining, based on the email address, that the first file is subject to the data loss prevention policy.

6. The computer-implemented method of claim 1, wherein:
    identifying the source of the first file comprises identifying an application within the network that generated the first file;
    determining, based on the application generating the first file within the network, that the first file is subject to the data loss prevention policy.

7. The computer-implemented method of claim 1, wherein:
    the network comprises a private local area network;
    determining that the origin of the first file is within the network comprises determining that the first file originated from within the private local area network.

8. The computer-implemented method of claim 1, further comprising:
    categorizing the source of the second file as a source where entities outside the network could freely access the second file and, as such, the second file does not contain sensitive information.

9. The computer-implemented method of claim 1, wherein:
    identifying the source of the second file comprises identifying a public web site from which the second file was downloaded to the network;
    determining that the origin of the second file is outside the network comprises determining, based on the public website being public and outside the scope of data loss prevention for the network, that the file is not subject to the data loss prevention policy.

10. The computer-implemented method of claim 1, wherein:
    identifying the source of the first file comprises identifying a plurality of different sources of the first file;
    determining, based on the source of the first file, that the first file is subject to the data loss prevention policy comprises determining, based on each source within the plurality of different sources of the first file, that the first file is subject to the data loss prevention policy.

11. A system for data loss prevention, the system comprising:
    an identification module programmed to:
        identify a network configured with a data loss prevention system;
        identify a first file within the network and identify a second file within the network;

a source module programmed to:
  identify a source of the first file by determining that an origin of the first file is within the network, and
  identify a source of the second file by identifying entry of the second file into the network and determining, in response to identifying the entry of the second file into the network, that an origin of the second file is outside the network, the source of the second file causing the entry of the second file into the network;
a determination module programmed to:
  determine, based on the source of the first file being within the network, that the first file is subject to a data loss prevention policy,
  determine, based on the source of the second file, that an origin of the second file is outside the network, and
  determine that the origin of the second file does not contain sensitive information intended to be protected by the data loss prevention system;
an application module programmed to:
  apply the data loss prevention policy to the first file based on the determination that the first file is subject to the data loss prevention policy, and
  allow a use of the second file based on a determination that the second file is not subject to the data loss prevention policy;
at least one processor configured to execute the identification module, the source module, the determination module, and the application module.

12. The system of claim 11, wherein:
the first file comprises corporate data;
the second file comprises personal data;
the determination module is programmed to differentiate between the corporate and personal data based on the sources of the first and second files.

13. The system of claim 11, wherein:
the determination module is programmed to use the source of the first file as a factor among one or more additional factors by generating a composite data loss threat score that factors in the source of the first file and a content-based scan of the first file.

14. The system of claim 11, wherein:
the network comprises an extended network of interest that includes a partner that contributes sensitive data to the network from outside the network;
the determination module is programmed to build a corporate directory that identifies email addresses from the partner by analyzing patterns of emails to identify email addresses that are likely to be email addresses associated with the partner;
the identification module is programmed to identify the source of the first file by determining that the first file was included with an email sent from an email address of the partner identified on the corporate directory.

15. The system of claim 11, wherein:
the source module is programmed to identify the source of the second file by identifying an email address of a sender of the second file to the network;
the determination module is programmed to determine, based on the email address, that the second file is not subject to the data loss prevention policy because the email address comprises an apparent personal email address.

16. The system of claim 11, wherein:
the source module is programmed to identify the source of the first file by identifying an application within the network that generated the first file;
the determination module is programmed to determine, based on the application generating the first file within the network, that the first file is subject to the data loss prevention policy.

17. The system of claim 16, wherein:
the source module is programmed to identify the application within the network that generated the first file by operating as part of a file system filter driver that identifies that the application is writing the first file to a location within the network.

18. The system of claim 16, wherein the source module is programmed to identify the application within the network that generated the first file by determining that the first file was generated by a specific application known to create sensitive data within the network.

19. The system of claim 11, wherein:
the identification module categorizes the source of the second file; and
the determination module determines that an origin of the second file is outside the network by looking up a rule for the category of the source of the second file.

20. A non-transitory computer-readable-storage medium comprising one or more computer-executable instructions that, when executed by at least one processor of a computing device, cause the computing device to:
  identify a network configured with a data loss prevention system;
  identify a first file subject to a data loss prevention assessment within the network;
  identify a source of the first file by determining that an origin of the file is within the network;
  determine, based on the source of the first file being within the network, that the first file is subject to a data loss prevention policy;
  apply the data loss prevention policy to the first file based on the determination that the first file is subject to the data loss prevention policy;
  identify entry of a second file into the network;
  in response to identifying the entry of the second file into the network, identify a source of the second file;
  determine, based on the source of the second file, that an origin of the second file is outside the network, the source of the second file causing the entry of the second file into the network;
  determine that the origin of the second file does not contain sensitive information intended to be protected by the data loss prevention system;
  allow a use of the second file based on a determination that the second file is not subject to the data loss prevention policy.

* * * * *